(12) United States Patent
Ringelberg et al.

(10) Patent No.: US 6,776,816 B1
(45) Date of Patent: Aug. 17, 2004

(54) METHODS FOR ACCELERATING PRODUCTION OF MAGNESIUM AMMONIUM PHOSPHATE WHILE ATTAINING HIGHER YIELDS THEREOF AND A SLOW-RELEASE FERTILIZER PRODUCED THEREFROM

(75) Inventors: David B. Ringelberg, Bradford, VT (US); Charles A. Weiss, Jr., Clinton, MS (US); Philip G. Malone, Vicksburg, MS (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 10/378,088

(22) Filed: Mar. 4, 2003

Related U.S. Application Data

(63) Continuation-in-part of application No. 09/832,900, filed on Apr. 12, 2001, now abandoned.

(51) Int. Cl.$^7$ ................................................ C05F 11/08
(52) U.S. Cl. ........................... 71/6; 71/8; 71/9; 71/10; 71/15; 71/21; 71/34; 71/61
(58) Field of Search .............................. 71/6, 8, 9, 10, 71/15, 21, 34, 61

(56) References Cited

U.S. PATENT DOCUMENTS

| | | | | |
|---|---|---|---|---|
| 4,326,976 A | * | 4/1982 | Logan et al. | 510/375 |
| 4,405,354 A | * | 9/1983 | Thomas et al. | 71/21 |
| 4,786,380 A | * | 11/1988 | van Duin et al. | 210/748 |
| 4,847,083 A | * | 7/1989 | Clark | 424/642 |
| 5,698,003 A | * | 12/1997 | Omilinsky et al. | 71/28 |
| 6,045,810 A | | 4/2000 | Moore | |
| 6,206,945 B1 | | 3/2001 | Weiss et al. | |
| 6,387,272 B2 | | 5/2002 | Hirth et al. | |

FOREIGN PATENT DOCUMENTS

| | | | |
|---|---|---|---|
| SE | 464520 | * | 5/1991 |

OTHER PUBLICATIONS

Clark, Vet Record, vol. 95(10), p.204–206, 1974.*
Ibrahim et al., Agartud. Kozl., vol. 33(1), pp. 193–198, 1974.*
Sainani, Fert. News, vol.33(5), p. 25–7, 1988.*
Yadav et al., J. Microb. Biotechnol., vol. 8(1), p. 29–38, 1993.*
Nabil ben Omar et al., Chemosphere, vol. 36(3), p. 475–481, 1988.*
Rivadeneira et al., Folia Microbiol., vo. 30, p. 56–57, 1985.*
Battistoni et al., Wat. Res., vol. 31(11), p. 2925–29, 1997.*
Ringelberg, David et al. Development of Techniques for Strengthening Deteriorated Concrete Using Bacterially–Precipitated and Enzymatically–Precipitated Mineral Phases, 22$^{nd}$ Army Science Conference, Baltimore, MD, pp. 17–18, Dec. 11–13, 2000.

* cited by examiner

Primary Examiner—C. Sayala
(74) Attorney, Agent, or Firm—Earl H. Baugher, Jr.

(57) ABSTRACT

Magnesium ammonium phosphate (struvite), suitable for use as a slow-release fertilizer for example, is produced by mixing animal manure with a pre-specified amount of a magnesium-rich compound. A pre-specified amount of an enzyme, such as an urease or uricase, is added to the resultant mixture. The temperature and pH of this mixture are maintained within a pre-specified range to facilitate precipitation of the magnesium ammonium phosphate. Optionally, the enzyme-supplemented mixture may be inoculated with a pre-specified amount of bacteria, such as *Bacillus sphaericus, Bacillus globisporus*, or *Bacillus fusiformis*, or a species of Bacillus identified as Bacillus sp. SB1. This bacteria-supplemented mixture is then allowed to incubate for about 14 days to form struvite. Alternatively, a pre-specified amount of phosphatase, an enzyme promoting the formation of phosphate from phosphorus-rich organic compounds, may be added with the first enzyme to further accelerate the process and increase the yield of struvite crystals.

28 Claims, No Drawings

METHODS FOR ACCELERATING PRODUCTION OF MAGNESIUM AMMONIUM PHOSPHATE WHILE ATTAINING HIGHER YIELDS THEREOF AND A SLOW-RELEASE FERTILIZER PRODUCED THEREFROM

RELATED INVENTIONS

This is a Continuation in Part of prior U.S. patent application Ser. No. 09/832,900, *Efficient Fertilizer and Enzyme-Assisted Method of Production*, by Ringelberg et al., filed Apr. 12, 2001, now abandoned and incorporated herein by reference.

GOVERNMENT INTEREST STATEMENT

Under paragraph 1(a) of Executive Order 10096, the conditions under which this invention was made entitle the Government of the United States, as represented by the Secretary of the Army, to the entire right, title and interest in any patent granted thereon by the United States. This and related patents are available for licensing. Additional information may be obtained from Phillip Stuart at (601) 634-4113 or Sharon Borland at (603) 646-4735.

FIELD OF THE INVENTION

This invention relates to a process for producing forms of magnesium ammonium phosphate (struvite) for various commercial applications to include slow-release fertilizer and possible crack repair in concrete. Fertilizer may be derived from a process for composting animal manure with a magnesium-rich compound and selected enzymes to which certain bacteria may be added to facilitate the production of a magnesium ammonium phosphate hydrate.

BACKGROUND

The formation of magnesium ammonium phosphate hexahydrate assisted by bacteria has been reported by Nabil Ben Mar et al., *Chemosphere*, vol. 36, No. 3, p 475–481, (1998). The removal of phosphate from supernatant liquors of anaerobically digested sludge by formation of struvite (magnesium ammonium phosphate) is reported by Battistoni et al., *Wat. Res.*, Vol. 31, No. 11, pp. 2925–2929, 1997. The formation of struvite by Azobacter in chemically defined media has been described by Rivadeneira et al., *Microbiol.* 30, 55–57 (1985).

U.S. Pat. No. 6,206,945 BI, *Method of Producing Artificial Guano*, to Weiss et al., Mar. 27, 2001, assigned to the same assignee as this patent and incorporated herein by reference, provides a much more complicated and costly multi-step process for precipitating magnesium ammonium phosphate than the instant invention. It involves mixing manure with soft-burned dolomite at elevated temperature, recovering ammonia thus liberated in an acid, neutralizing the mixture, combining the recovered ammonium salt with the mixture, adding guano-forming bacteria, and allowing the resultant mixture to ferment.

The '945 patent requires the following steps, each incurring expense avoided in the present invention:

a) water is added b) carbon dioxide gas is added (and released, possibly being recaptured at additional expense)

c) high heat is generated, requiring more expensive containers d) high alkalinity conditions require more expensive containers e) a separate container and handling system is needed to handle the ammonia f) acid must be supplied to mix with the ammonia Further, work done by the present inventors indicates that magnesium ammonium phosphate need not necessarily be precipitated in large batches, but may also be suitable for "growing" in cracks in concrete. Ringelberg, David B. et al., *Development of Techniques for Strengthening Deteriorated Concrete Using Bacterially-Precipitaied and Enzymatically-Precipitated Mineral Phases*, $22_{nd}$ Army Science Conference, Baltimore, Md., pp. 17–18, 11–13 Dec. 2000.

The combination of complementing enzymes with added bacteria in an energy efficient, simplified, cost-effective and safe process in accordance with a preferred embodiment of the present invention accelerates the production of crystalline magnesium ammonium phosphate when compared to previous methods while also increasing yield as compared to previous methods.

SUMMARY

In general, an enhanced process produces struvite quicker and at higher yields than existing methods while employing energy efficient steps. In one embodiment, a basic form of the enhanced process yields an efficient fertilizer from animal excreta added to a mix that is then composted. The basic form of the process involves cost-effective measures of first determining the nitrogen content of the animal excreta, and then adding only that pre-specified amount of a magnesium compound to the animal excreta necessary to interact with the measured nitrogen content. Again using a cost effective means, the pH of the resultant mix is adjusted to within a pre-specified range of pH, followed by the addition of a pre-specified amount of at least one enzyme to the mix. Adding one or more enzymes increases the rate of breakdown of the urea and uric acid, thus getting ammonia production started earlier than would occur, with any existing bacteria alone. The resultant composted mix is maintained within a pre-specified temperature range, optimally requiring minimal added heat, for a pre-specified time. Pre-specified species of bacteria may then be added, providing a "booster" shot of enzymes as the bacteria grow and produce their own enzymes "internally." Upon fulfilling these conditions, struvite is formed earlier in the composting process, and at higher yields, than it would be formed using processes heretofore available.

Preferred magnesium compounds include a magnesium carbonate and a magnesium hydroxide, and combinations thereof, in amounts between preferably about 1.5 and 2.0 parts, and more preferably of about 1.7 parts, of either of these magnesium compounds, or like compounds, or combinations thereof, per part of the nitrogen in the animal excreta. The enzyme, or enzymes, are added in the pre-specified amount of preferably between 0.25 and 0.75 g/l and most preferably at about 0.5 g/l (total enzyme mass) of the composted mix.

In another embodiment, the composted mix is inoculated with pre-specified species of bacteria after the enzyme (enzymes) is (are) added to the compost mix. These bacteria, through excretion of enzymes internal to them, further promote the formation of struvite as crystals outside the cell structure of the composted mix. These "internal enzymes" raise the pH of the composted mix, facilitating the added bacteria to become the dominant organism in the composted mix because of the elevated pH. These pre-specified species of bacteria also contribute to maintaining high levels of the added enzyme (or enzymes) and assure that the nitrogen and phosphorous are released on an accelerated timetable and struvite formed at higher yields than previously possible.

A preferred strain of these pre-specified bacteria is the species *Bacillus sphaericus*. In particular, a species of Bacillus designated Bacillus sp. SB1, derived from processing bat and seabird guano, has proven to be the optimum bacteria in terms of accelerating the formation process and increasing yield of struvite. However, bacteria that have been shown to facilitate the process may be any of *Bacillus sphaericus*, *Bacillus globisporus*, and *Bacillus fusiformis*.

Enzymes may be an urease, an uricase (also known as urate oxidase), intermediates such as allantoinase and allantoicase (also known as allantoine amidinohydroiase) and a phosphatase or any combination of the non-phosphatase types and phosphatase, i.e., a phosphatase and any one or more of the other enzymes. The complete pathway for the conversion of uric acid to ammonia may be described as: uric acid conversion to allantoin (due to action of uricase)—allantoin conversion to allantoic acid (due to action of allantoinase)—allantoic acid conversion to urea (due to action of allantoicase)—urea conversion to ammonia (due to action of urease).

A preferred urease is jack bean urease. A preferred phosphatase enzyme is a 1000 units/microliter ($\mu l$) concentration of bovine alkaline phosphatase added to result in about 50 milliliter per liter (ml/l) of the composted mix after it has been mixed therein.

The pH may be adjusted within a preferred range of about 7–10 by simple aeration of the composted mix, while the mixture is maintained within a preferred temperature range of about 20–30° C. for a preferred period of about 10–20 days and more preferably for about 14 days.

Also provided as an embodiment of the present invention is a slow-release fertilizer that efficiently provides nitrogen and phosphorous as nutrients to plants. The fertilizer is produced, at least in part, by mixing animal excreta; a pre-specified amount of a magnesium compound, and a pre-specified amount of at least one enzyme, to comprise a composted mix having a cell structure. The composted mix is then maintained within a pre-specified range of pH and a pre-specified temperature range for a pre-specified time. As a result of this process, nitrogen and phosphorous precipitate from the composted mix in a precipitate comprising at least struvite. The preferred pH range for producing this fertilizer is about 7–10. The preferred temperature range at which the composted mix is maintained is about 20–30° C. The preferred period of composting is a range of about 10–20 days, more preferably about 14 days. This slow-release fertilizer releases nitrogen and phosphorous for use by plants over an extended period of time, with less loss to leaching than conventional fertilizers or even conventional slow-release fertilizers.

The process for producing this slow-release fertilizer may be facilitated, at least in part, by further adding bacteria to the composted mix. These bacteria, through excretion of enzymes internal to them, promote the formation of struvite as crystals outside the cell structure of the composted mix. These "internal enzymes" raise the pH of the composted mix, facilitating the added bacteria in becoming the dominant organism in the composted mix. This leads to accelerated production of the fertilizer at higher yields than otherwise possible using existing methods. Further, these bacteria are added to maintain higher levels of at least one enzyme and assure that nitrogen and phosphorous are released and at least struvite is formed at an accelerated rate and higher yields than heretofore possible.

To produce this slow-release fertilizer, a preferred strain of bacteria is the species *Bacillus sphaericus*. In particular, a species designated Bacillus sp. SB1, derived from processing bat and seabird guano, has proven to be the optimum bacteria in terms of accelerating the formation process and increasing yield of struvite. However, bacteria that have been shown to facilitate the process may be any of *Bacillus sphaericus*, *Bacillus globisporus*, and *Bacillus fusiformis*.

Enzymes used in producing this slow-release fertilizer may be either an urease, an uricase, intermediates, such as allantoinase and allantoicase (also known as allantoine amidinohydrolase), phosphatase, or a combination of the two types, i.e., a phosphatase and any one or more of the other enzymes. A preferred urease is jack bean urease. A preferred phosphatase enzyme is a 1000 units/$\mu l$ concentration of bovine alkaline phosphatase added to result in about 50 ml per liter of the composted mix after it has been mixed therein.

In producing this slow-release fertilizer, the pH may be adjusted within a preferred range of about 7–10 by simple aeration of the composted mix, while the mixture is maintained within a preferred temperature range of about 20–30° C. for a preferred period of about 10–20 days and more preferably for about 14 days.

In producing this slow-release fertilizer, a preferred magnesium compound may be either a magnesium hydroxide or a magnesium carbonate, or combinations thereof, in amounts between preferably about 1.5 and 2.0 parts, and more preferably of about 1.7 parts, of either of these magnesium compounds, or like compounds, or combinations thereof, per part of the nitrogen in the animal excreta. The enzyme, or enzymes, are added in the pre-specified amount of preferably between 0.25 and 0.75 g/l and most preferably at about 0.5 grams (total enzyme mass of all enzymes added separately) per liter of the composted mix.

In summary, composting of a mix of animal manure and a magnesium-rich compound is facilitated by the addition of selected enzymes that produce ammonia from urea and uric acid (urease or uricase) and, of course, any intermediates, and form phosphates from phosphate-rich organics, such as phosphatase. The process is accelerated by then adding to the mix selected organisms that facilitate the production of magnesium ammonium phosphate hydrate by breaking down other organic compounds and producing additional enzymes that, in turn, further accelerate release of nitrogen and phosphorous and the formation of struvite. The temperature of this mixture is maintained at about 20–30° C. and the pH is maintained between about 7–10. Urease is added to the mixture. Next, the mixture is inoculated with bacteria, preferably of the Bacillus species, such as *Bacillus sphaericus*, *Bacillus globisporus*, and *Bacillus fusiformis*, and more preferably a Bacillus species designated Bacillus sp. SB1. The mixture is then allowed to incubate preferably for about 10–20 days, more preferably about 14 days to form magnesium ammonium phosphate. Optionally, phosphatase, an enzyme promoting the formation of phosphate from phosphorus-rich organic compounds, is added with an urease or uricase enzyme to further increase the yield of magnesium ammonium phosphate. Advantages of the present invention include:

increased yield of ammonium magnesium phosphate per unit of composted mass;

accelerated production of ammonium magnesium phosphate;

reduced energy cost for producing ammonium magnesium phosphate;

reduced capitalization costs for equipment to produce ammonium magnesium phosphate;

increased safety to workers in producing the ammonium magnesium phosphate;

reduced need for ancillary equipment to comply with emissions regulations;

reduced need to procure and handle caustic materials; and reduced maintenance expenses because of lowered operating temperatures and benign components used.

DETAILED DESCRIPTION

Animal manure is mixed with a magnesium compound having low water solubility. Alternatively, it may be mixed with an aqueous solution of a magnesium salt. The amount of nitrogen in the animal manure is measured. Magnesium carbonate or magnesium hydroxide, preferably in the amount of about 1.5–2.0 parts and more preferably in the amount of about 1.7 parts per part of nitrogen in the manure, is added to the animal manure.

Alternatively, highly water-soluble magnesium salts, such as magnesium chloride and magnesium sulfate, may be used. However, their dosage must be carefully controlled to prevent increasing the osmotic pressure of the mixture which is detrimental to the bacteria needed for carrying out the process. In addition, magnesium sulfate may generate sulfides or mercaptans, leading to an offensive odor and toxic emissions. Advantageously, a magnesium carbonate or a magnesium hydroxide provides alkaline buffering to prevent the magnesium ammonium phosphate from dissolving after it forms.

The temperature of this mixture is maintained in the range of about 20–30° C. Preferably, the pH is adjusted to within the range of about 7–10 by aeration. Alternatively, the pH may be adjusted by the addition of an acid. Preferably, one or more enzymes, such as urease or uricase, are added to the mixture at a preferable dosage of about 0.25–0.75 g/l, and more preferably about 0.5 g of urease (or uricase) per liter of mixture. A preferred urease is bean sprout urease and a more preferred urease is Jack bean urease Type IX at 62,100 units per gram. A suitable urease is marketed by Worthington Biochemical Corporation, Lakewood, N.J. Preferably, this solid enzyme is mixed with a 0.1 molar phosphate buffer to bring the enzyme into solution.

This mixture is then inoculated with bacteria, preferably of the species *Bacillus sphaericus, Bacillus globisporus*, or *Bacillus fusiformis*, and more preferably of the species Bacillus sp. SB1 that may be isolated from guano, such as may be available from bats or seabirds. Alternatively, commercially produced guano may be used. The resultant mixture is allowed to incubate, preferably for about 10–20 days, and more preferably for about 14 days, preferably at about 20–30° C. and more preferably at about 25 to 30° C. to form magnesium ammonium phosphate.

In an alternate preferred embodiment of the present invention, a phosphatase enzyme is added to the batch. Typically, an alkaline phosphatase, such as bovine alkaline phosphatase (Roche Molecular Biochemicals), is used. Preferably, bovine alkaline phosphatase, at a concentration of 1000 units/microliter, is added at a dosage of 50 ml to one liter of manure. Preferably, in the alternate preferred embodiment, the phosphatase enzyme is blended with the manure after the addition of the urease or uricase and before any bacterial inoculation.

EXAMPLE

A novel species of Bacillus, specifically most likely of *Bacillus sphaericus*, designated Bacillus sp. SB1, has been isolated from bat and seabird guano. Bacillus sp. SB1 is a rod-shaped Gram-positive bacterium capable of growth at a pH of at least 9.0 and temperatures as high as 45° C. Nucleic acid analysis of the 16S ribosomal DNA fragment indicated a 97% and 91% similarity with that of Bacillus sp. in alignment to GeneBank and Ribosomal Database Project (RDP) entries, respectively. Fatty acid analysis indicated the presence of iso and anteiso terminally branched saturated moieties (C15 and C17), which is also consistent with the genus Bacillus. Although both phenotypic and genotypic descriptions were consistent, a species identification was not possible since the genetic difference between the guano isolate and Bacillus sp. was equal to the genetic difference between Bacillus sp. and another known Bacillus, *Bacillus fusiformis*. Ringelberg et al. (2000).

Bacillus sp. SB1 is believed to be non-pathogenic and produces abundant struvite crystals when grown in relatively simple culture media, such as tryptic soy, urea, magnesium salts (carbonate, chloride, nitrate, sulfate) and a dibasic phosphate buffer. Struvite yields of about 8 g/l after 10 days of incubation have been demonstrated. Bacillus sp. SB1 has shown an ability to grow in media having a pH at least as high as 9.0, making it suitable for applications involving concrete repair. Initial tests with concrete substrates indicate that Bacillus sp. SB1does catalyze struvite crystal production and that the crystals adhere to the concrete surface. Ringelberg et al. (2000).

Bacillus sp. SB1 is ureolytic positive. This enables the principal mechanism catalyzing struvite crystal formation in liquid culture. Ureolytic positive organisms produce the enzyme urease, which enables the bacteria to derive ammonia and carbon dioxide from urea. The ammonia resulting from urease activity facilitates the chemical reactions with magnesium and phosphate in the formation of struvite crystals.

A simplified concrete treatment system was implemented to ascertain the viability of using enzyme-assisted struvite formation to repair small cracks in concrete. The system employed a solution of magnesium and phosphate salt along with a synthetic urea and urease.

The system precipitated struvite crystals in the absence of bacteria. Further, commercially available urease concentrates, such as those available from extracts of jack bean meal, have been shown to retain activity at elevated pH typical of a concrete environment, i.e., 9.0–10.5, and produce struvite crystals similar to that obtained with bacteria alone, but at greater yields. Typical struvite yields from the addition of 50 g/l of urease, averaged twice that obtained from using bacteria alone and were able to be harvested in ten (10) days as compared to the nominal 14-day incubation period for bacteria (alone)-induced struvite production. These yields demonstrate that a 50 g/l concentration of jack bean urease Type IX at a concentration of 62,100 units per gram yielded 19 g/l of struvite crystals over a 10-day incubation. In comparison, a 100 g/l concentration yielded the same 19 g/l of struvite crystals while a 25 g/l concentration of the urease yielded 10 g/l. Ringelberg et al. (2000).

Struvite crystal formation is not instantaneous but occurs at a rate corresponding to the activity of the enzyme, or enzymes, added to catalyze formation. Thus a urease (or uricase) based solution may be used to infiltrate pores and microfractures in concrete before the urea is decomposed to ammonia, in turn, leading to struvite crystal precipitation in place, i.e., within voids having very small physical dimensions.

While there have been shown and described what are considered at present to be the preferred embodiments of the present invention, it will be appreciated by those skilled in the art that modifications of such embodiments may be made. It is therefore desired that the invention not be limited to these embodiments and it is intended to cover in the appended claims all such modifications as fall within the true spirit and scope of the invention.

We claim:

1. An enhanced process for both accelerating production and increasing the yield of ammonium magnesium phosphate when compared to existing methods, comprising:

providing animal excreta;

determining the nitrogen content of said animal excreta;

adding a pre-specified amount of at least one magnesium compound to said animal excreta to yield a first mix, wherein said pre-specified amount is based on said nitrogen content;

adjusting the pH of said first mix to within a pre-specified range of pH to yield a second mix;

adding a pre-specified amount of at least one enzyme to said second mix to yield a third mix having a cell structure, wherein said at least one enzyme is mixed with a 0.1 molar phosphate buffer to bring said at least one enzyme into solution;

maintaining said third mix at a pre-specified temperature range for a pre-specified time;

wherein said ammonium magnesium phosphate is precipitated.

2. The enhanced process of claim 1 in which said at least one magnesium compound is selected from the group consisting essentially of: a magnesium carbonate, a magnesium hydroxide, and combinations thereof.

3. The enhanced process of claim 1 in which said pre-specified amount of said at least one magnesium compound is between about 1.5 and 2.0 parts per part of said nitrogen in said animal excreta and said pre-specified amount of said at least one enzyme is between about 0.25 and 0.75 grams per liter of said third mix.

4. The enhanced process of claim 1 in which said pre-specified amount of said at least one magnesium compound is about 1.7 parts per part of said nitrogen in said animal excreta and said pre-specified amount of said at least one enzyme is about 0.5 grams per liter of said third mix.

5. The enhanced process of claim 1 in which said third mix is inoculated with at least one species of bacteria to yield a fourth mix having a cell structure, wherein, said at least one species of bacteria, through excretion of at least one enzyme internal to said at least one species of bacteria, promotes the formation of said struvite as crystals outside said cell structure of said fourth mix, and wherein, said at least one enzymes internal to said at least one species of bacteria raise the pH of said fourth mix, facilitating said at least one species of bacteria to become the dominant organism in said fourth mix, and wherein, said added at least one species of bacteria facilitate maintenance of higher levels of said at least one enzyme than would be available without said at least one species of bacteria being added, and wherein the formation of said magnesium ammonium phosphate is further accelerated and is provided at a greater yield than would be possible without said at least one species of bacteria being added.

6. The enhanced process of claim 5 in which said at least one species of bacteria are selected from the group consisting essentially of: *Bacillus sphaericus*, *Bacillus globisporus*, *Bacillus fusiformis*, Bacillus sp. SB1, and combinations thereof.

7. The enhanced process of claim 5 in which said at least one species of bacteria is Bacillus sp. SB1.

8. The enhanced process of claim 1 in which said at least one enzyme is selected from the group consisting essentially of: an urease, an uricase, phosphatase, and combinations thereof.

9. The enhanced process of claim 1 in which said at least one enzyme is a bean sprout urease.

10. The enhanced process of claim 1 in which said at least one enzyme is jack bean urease.

11. The enhanced process of 1 in which said at least one enzyme is phosphatase.

12. The enhanced process of claim 1 in which said adjustment of pH is accomplished by aeration of said first mix.

13. The enhanced process of claim 1 in which:

said pre-specified range of pH is about 7–10;

said pre-specified temperature range is about 20–30° C.; and said pre-specified time period is about 10–20 days.

14. The enhanced process of claim 1 in which:

said pre-specified range of pH is about 7–10;

said pre-specified temperature range is about 25–30° C.; and said pre-specified time period is about 14 days.

15. A slow-release fertilizer that efficiently provides nitrogen and phosphorous as nutrients to plants, said fertilizer provided as a precipitate derived at least in part from mixing animal excreta, a pre-specified amount of a magnesium compound, and a pre-specified amount of at least one enzyme in a resultant mix having a cell structure, said resultant mix being maintained at a pre-specified range of pH and a pre-specified temperature range for a pre-specified time, wherein said nitrogen and said phosphorous are elements in said precipitate from said resultant mix, said precipitate comprising at least magnesium ammonium phosphate, and wherein said fertilizer releases said nitrogen and said phosphorous for use by said plants over an extended period of time and with less loss to leaching when compared to fertilizers that contain nitrogen and phosphorous that are not elements in said precipitate comprising at least magnesium ammonium phosphate.

16. The slow-release fertilizer of claim 15 derived at least in part by further adding at least one species of bacteria to said resultant mix, wherein said at least one species of bacteria, through excretion of enzymes internal to said at least one species of bacteria, promote the formation of said struvite as crystals outside said cell structure of said resultant mix, and wherein, said internal enzymes raise the pH of said resultant mix, facilitating said at least one species of bacteria to become the dominant organisms in said resultant mix, and wherein said at least one species of bacteria are added to maintain higher levels of said at least one enzyme than otherwise available without said added at least one species of bacteria, and wherein the formation of said magnesium ammonium phosphate is further accelerated and is provided at a greater yield than would be possible without said at least one species of bacteria being added.

17. The slow-release fertilizer of claim 16 in which said at least one species of bacteria is selected from the group consisting essentially of: *Bacillus sphaericus, Bacillus globisporus, Bacillus fusiformis*, Bacillus sp. SB1, and combinations thereof.

18. The slow-release fertilizer of claim 16 in which said at least one species of bacteria is Bacillus sp. SB1.

19. The slow-release fertilizer of claim 15 in which said at least one enzyme is selected from the group consisting essentially of: an urease, an uricase, phosphatase, and combinations thereof.

20. The slow-release fertilizer of claim 15 in which said at least one enzyme is an urease wherein said urease is mixed with a 0.1 molar phosphate buffer to bring said urease into solution.

21. The slow-release fertilizer of claim 20 in which said urease is a bean sprout urease.

22. The slow-release fertilizer of claim 20 in which said urease is jack bean urease.

23. The slow-release fertilizer of claim 15 in which said magnesium compound is selected from the group consisting essentially of: a magnesium hydroxide, a magnesium carbonate, and combinations thereof.

24. The slow-release fertilizer of claim 15 in which said adjustment of pH is accomplished by aeration of said first mix.

25. The slow-release fertilizer of claim 15 in which:
said pre-specified range of pH is about 7–10;
said pre-specified temperature range is about 20–30° C.; and
said pre-specified time period is about 10–20 days.

26. The slow-release fertilizer of claim 15 in which:
said pre-specified range of pH is about 7–10;
said pre-specified temperature range is about 25–30° C.; and
said pre-specified time period is about 14 days.

27. The enhanced process of claim 1 in which said adjustment of pH is accomplished by adding an acid to said first mix as necessary.

28. The slow-release fertilizer of claim 15 in which said maintenance of said range of pH is accomplished by the addition of an acid to said first mix as necessary.

* * * * *